Patented Oct. 11, 1927.

1,644,849

UNITED STATES PATENT OFFICE.

PAUL NAWIASKY, OF LUDWIGSHAFEN-ON-THE-RHINE, AND OTTO BRAUNSDORF AND EDUARD HOLZAPFEL, OF HOCHST-ON-THE-MAIN, GERMANY, ASSIGNORS, BY MESNE ASSIGNMENTS, TO GRASSELLI DYESTUFF CORPORATION, OF NEW YORK, N. Y., A CORPORATION OF DELAWARE.

MANUFACTURE OF ISODIBENZANTHRONES.

No Drawing. Application filed November 23, 1925, Serial No. 71,022, and in Germany March 5, 1925.

We have found that by treating unsymmetrically substituted Bz-1.Bz-1'-benzanthronyl sulfids having free 2-positions, with alkaline condensing agents, unsymmetrically substituted isodibenzanthrones are obtained which are remarkable by reason of their excellent tinctorial properties.

The said dibenzanthronyl sulfids may either possess a substituent in one benzanthronyl radicle while the other benzanthronyl radicle is unsubstituted, or they may have different substituents in the two benzanthronyl radicles.

Our invention is further illustrated by the following examples to which, however, the invention is not limited. The parts are by weight.

*Example 1.*

1 part of Bz-2-methoxy-Bz-1.Bz-1'-benzanthronyl sulfid, melting point 338 to 340 degrees centigrade, (which may be obtained for example by condensing Bz-2-methoxy-Bz-1-chlor-benzanthrone with Bz-1-benzanthrone-mercaptane) corresponding to the formula

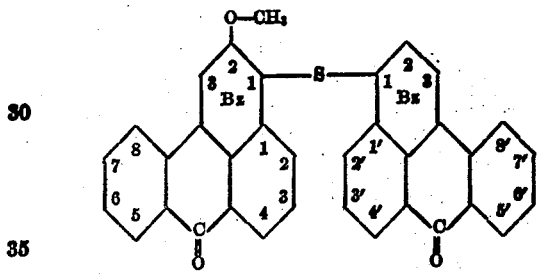

is introduced at about 140 degrees centigrade into a melt prepared from 5 parts of caustic potash and 5 parts of ethyl alcohol. The mixture is kept at the said temperature for an hour; it is then poured into water while stirring and worked up in the usual manner.

The Bz-2-methoxy-isodibenzanthrone corresponding to the formula

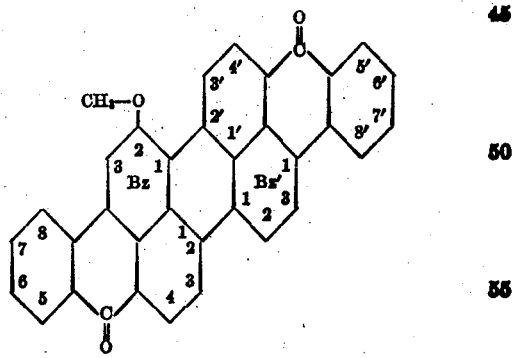

dyes cotton from a warm sodium hydrosulfite vat which has a pure blue color, very strong and clear blue-violet shades of excellent fastness. The dyestuff dissolves in concentrated sulfuric acid with a bluish green color.

*Example 2.*

2 parts of 6-amino-Bz-1.Bz-1'-benzanthronyl sulfid corresponding to the formula

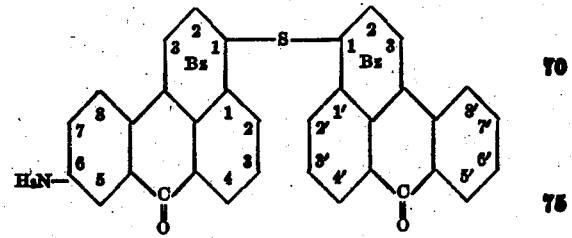

which may be obtained for example by condensing 6-amino-Bz-1-chlorbenzanthrone with Bz-1-benzanthrone-mercaptane, are introduced at a temperature of 140 degrees to 150 degrees centigrade into a melt prepared from 10 parts of caustic potash and 10 parts of ethyl alcohol, and kept at this temperature for about an hour. The melt is worked up in the usual manner, and 6-amino-isodibenzanthrone corresponding to the formula

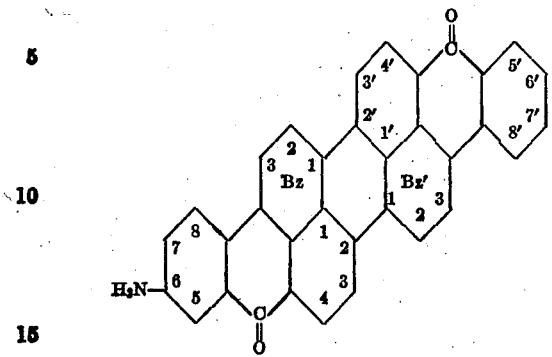

is obtained with good yield; it dissolves in concentrated sulfuric acid bluish green and dyes cotton from a warm sodium hydrosulfite vat strong violet shades.

We claim:

1. The process of manufacturing unsymmetrically substituted isodibenzanthrones which consists in treating unsymmetrically substituted Bz-1.Bz-1'-benzanthronyl sulfids having free 2-positions with alkaline condensing agents.

2. The process of manufacturing unsymmetrically substituted isodibenzanthrones which consists in treating unsymmetrically substituted Bz-1.Bz-1'-benzanthronyl sulfids having free 2-positions with a mixture of caustic alkali and an alcohol at an elevated temperature.

3. As a new article of manufacture, a vat coloring matter of the isodibenzanthrone series which is free of halogen and dyes from a pure blue vat pure bluish violet shades and which may be obtained by heating Bz-2-methoxy-Bz-1.Bz-1'-benzanthronyl sulfid with a mixture of caustic alkali and alcohol.

In testimony whereof we have hereunto set our hands.

PAUL NAWIASKY.
OTTO BRAUNSDORF.
EDUARD HOLZAPFEL.